United States Patent [19]

Ima

[11] Patent Number: 4,620,776

[45] Date of Patent: Nov. 4, 1986

[54] MICROSCOPE SPECIMEN SLIDE CLIP

[76] Inventor: Toshio Ima, 2-38-5 Aobacho, Higashimurayama, Tokyo, Japan

[21] Appl. No.: 674,554

[22] Filed: Nov. 26, 1984

[51] Int. Cl.[4] .......................................... G02B 21/26
[52] U.S. Cl. ................................................. 350/529
[58] Field of Search ............... 350/529, 534, 530, 531, 350/532

[56] References Cited

U.S. PATENT DOCUMENTS

| | | | |
|---|---|---|---|
| 2,200,053 | 5/1940 | Brown et al. | 350/534 |
| 3,848,963 | 11/1974 | Peck | 350/529 |
| 3,862,793 | 1/1975 | Gallant | 350/529 |

OTHER PUBLICATIONS

"Educational Microscopes", Southern Precision Instrument Co., Inclined Monocular Microscope, Model 1844, 1 page tear sheet.
"Educational Microscopes", Southern Precision Instrument Co., Vertical Monocular Microscope, Model 1815, 1 page tear sheet.

*Primary Examiner*—John K. Corbin
*Assistant Examiner*—Vincent J. Lemmo
*Attorney, Agent, or Firm*—Gregory W. Moravan

[57] ABSTRACT

A microscope specimen slide clip comprising a contoured clip blade supported by a brace and a spring. The clip blade includes a protruding actuating portion which, when depressed, causes the clip blade to pivot vertically on the spring to permit a specimen slide to be inserted or removed under the holding portion of the clip blade. The spring may be replaced by a tubular piece of resilient material. The brace may either be directly screwed into the microscope to mount the microscope specimen slide clip or the brace may be secured to the microscope by a screw which passes through a bore in the brace.

6 Claims, 3 Drawing Figures

MICROSCOPE SPECIMEN SLIDE CLIP

BRIEF SUMMARY OF THE INVENTION

A pair of microscope specimen slide clips are conventionally used to firmly retain or hold a specimen slide in a fixed position for viewing on a microscope stage or slide carrier.

A typical conventional one-piece microscope specimen slide clip comprises a resilient clip blade pivotally mounted to the microscope stage or slide carrier. To remove or insert a specimen slide, the user normally pulls up on the end of the clip blade that holds the specimen slide, and then applies a lateral pivoting motion until the clip blade clears the specimen slide. Since there is virtually no means of controlling or limiting the amount of force exerted during such movements of the clip blade by various individuals, this repeated action over a period of time will have a strong tendency to bend, distort or even break the conventional clip blade.

In basic form, the microscope specimen slide clip of the present invention comprises an elongated contoured clip blade which has a relatively long holding portion and a relatively shorter actuating portion, wherein its holding portion and actuating portion are separated by a pivot portion. The clip blade is mounted to a brace at the clip blade's pivot portion and is there resiliently supported, as by a spring or other resilient element. The resilient support not only ensures the clip blade's holding portion exerts sufficient pressure on the specimen slide such that the specimen slide will remain in a fixed position for viewing on the microscope stage, but also permits the holding portion of the clip blade to pivot upwardly when the actuating portion of the clip blade is pressed downwardly, to permit the easy removal and insertion of the specimen slide beneath the microscope specimen slide clip.

One of the advantages of the microscope specimen slide clip of the present invention is that it affords easier placement and removal of a specimen slide beneath the slide clip, since only a thumb is required to raise each slide clip blade, and thus the user is permitted free use of all of his fingers. By comparison, the conventional clip normally is raised and pivoted with the index finger; hence other finger and hand movement is highly restricted.

Another advantage of the microscope specimen slide clip of the present invention is that it will definitely outlast a typical one-piece conventional microscope specimen slide clip since it is less prone to being bent, distorted or possibly broken. This is because the holding portion of the clip blade need never be touched by the user to insert or remove a slide, since the holding portion is designed to be raised and lowered by the user pressing and releasing the actuating portion of the clip blade. This eliminates any possible bending, distortion or breaking of the clip blade.

It is to be understood that the foregoing is intended to be but a brief summary of, not a detailed catalog of, the objects, features, advantages and characteristics of the present invention, since these and further objects, features, advantages and characteristics will be inherently or expressly disclosed in this document.

DETAILED DESCRIPTION

Figure 1:
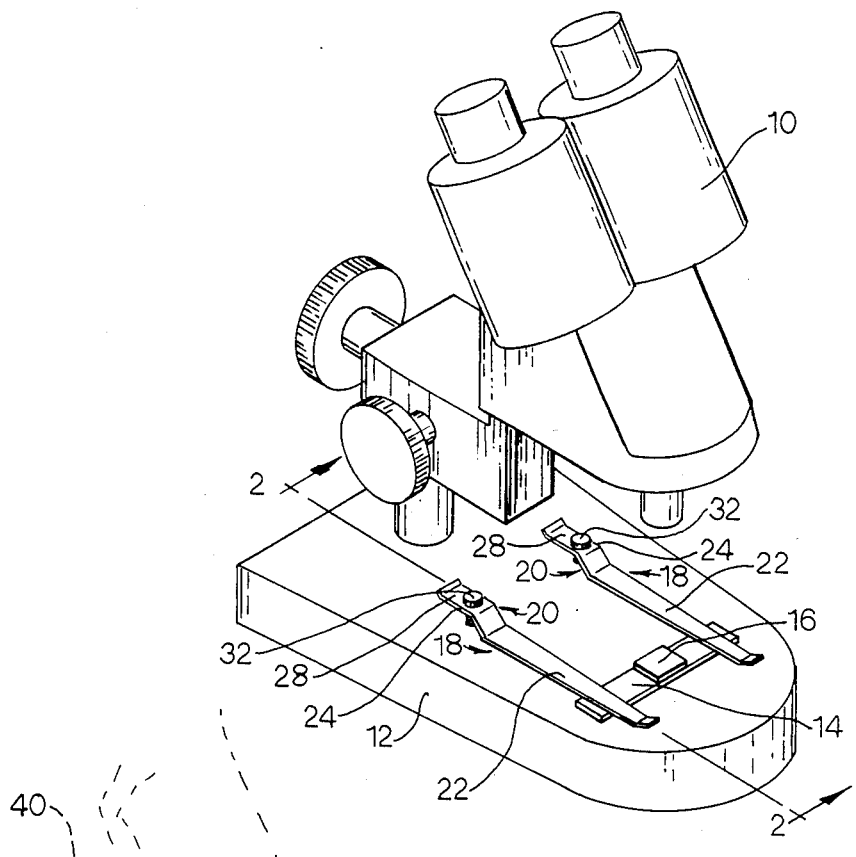
FIG. 1 is a perspective view showing two microscope specimen slide clips of the present invention mounted on the viewing stage of a typical microscope.

Referring now to FIG. 1, a conventional erect microscope 10 is schematically illustrated having a viewing stage 12. A conventional specimen slide 14 and specimen 16 are releasably, but firmly, held in a fixed position on viewing stage 12 for viewing through microscope 10 by a pair of microscope specimen slide clips 18 of the present invention which do not obstruct the viewing of the specimen 16 through the microscope 10.

Figure 2:
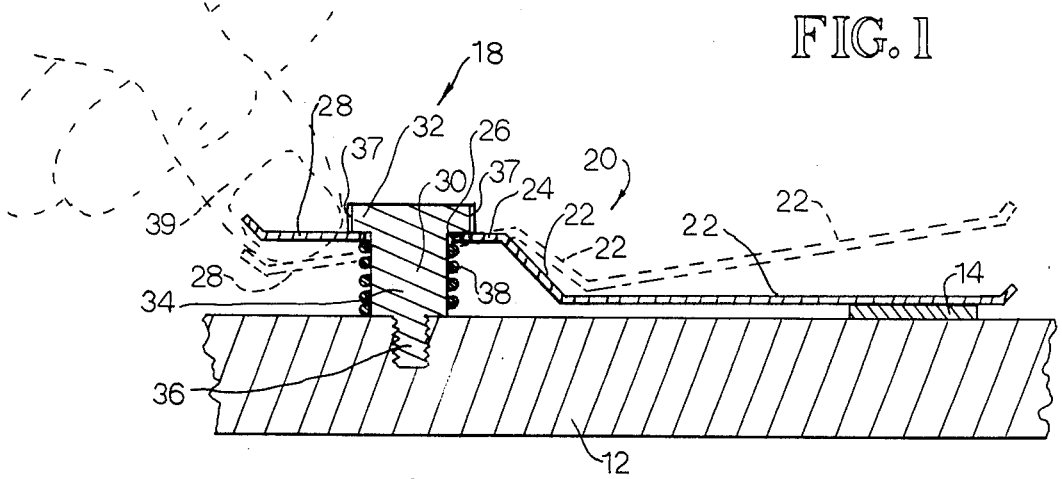
FIG. 2 is a cross-sectional view of one of the microscope specimen slide clips of the present invention taken along line 2—2 of FIG. 1.

Turning now to FIGS. 1-2, each microscope specimen slide clip 18 of the present invention has a clip blade 20 composed of three portions—a contoured holding portion 22, a pivot portion 24 having a hole 26, and an actuating portion 28.

Each clip blade 20 is secured to the microscope stage 12 (or to a microscope slide carrier, not illustrated) by a brace 30 having a head 32, a shaft 34 and a threaded stem 36. As seen, the brace 30's shaft 34 passes through hole 26 in the pivot portion 24 of clip blade 20 and through spring 38, while brace 30 is secured in place in microscope stage 12 by its threaded stem 36 which is screwed into microscope stage 12. The head 32 of brace 30 may have knurls 37 for increased ease in mounting or tightening brace 30 to microscope stage 12.

Spring 38 preferably has an external diameter less than the diameter of head 32 of brace 30. Spring 38 is selected to be of sufficient size and resilience such that it will firmly compress clip blade 20 against the lower surface of head 32 of brace 30. This compression of clip blade 20 by spring 38, and the contouring of the holding portion 22 of clip blade 20 are selected such that the holding portion 22 of clip blade 20 will exert sufficient pressure on specimen slide 14 such that the holding portion 22 of clip blade 20 will releasably, but firmly, hold specimen slide 14 in place on the microscope stage 12.

The size and resilience of spring 38, and the length of the actuating portion 28 of clip blade 20 are selected such that when the user presses on the actuating portion 28 of clip blade 20, as with the thumb 39 of his hand 40, the holding portion 22 of clip blade 20 is easily raised clear of specimen slide 14 (as seen in phantom, FIG. 2) to permit the easy removal or insertion of specimen slide 14 beneath the holding portion 22 of clip blade 20. It is seen that during this operation, the pivot portion 24 of the clip blade 20 pivots vertically on top of spring 38. The hole 26 in clip blade 20 is sized sufficiently larger than the shaft 34 of clip blade 20 to permit such vertical pivoting of the clip blade 20. The size and resilience of spring 38 is selected to permit the easy vertical pivoting of clip blade 20 on top of spring 38.

It may be noted that by pressing laterally on the actuating portion 28 of clip blade 20, the holding portion 22 of clip blade 20 may be pivoted laterally clear of the specimen slide 14 to permit removal or insertion of specimen slide 14 beneath holding portion 22 of clip blade 20. During this operation, the pivot portion 24 of the clip blade 20 pivots laterally on top of spring 38. The size and resilience of spring 38 is selected to permit the easy lateral pivoting of clip blade 20 on top of spring 38.

Figure 3:
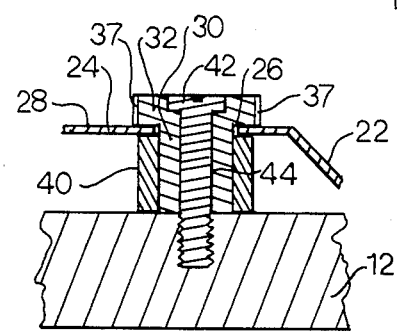
FIG. 3 is a cross-sectional view similar to that of FIG. 2, showing certain modifications of the present invention.

Referring now to FIG. 3, two modifications of the microscope specimen slide clip 18 of the present invention seen in FIGS. 1 and 2 are shown. The first modification consists of replacing spring 38 with a tubular piece of resilient material 40 which is selected to be of sufficient size and resiliency that it will functionally replace the spring 38 which was previously described. Here, again, it is preferred that the external diameter of resilient material 40 not exceed the diameter of the head 32 of brace 30.

The second modification is that instead of brace 30 having a threaded stem 36 which is screwed into microscope stage 12, brace 30 instead may be secured to microscope stage 12 by a screw 42 or other fastener which passes through a bore 44 in brace 30 as shown in FIG. 3.

From the foregoing various further applications, modifications and adaptations of the invention disclosed herein will now be apparent to those skilled in the art to which it pertains, within the scope of the claims appended hereto.

What is claimed is:

1. A microscope slide clip adapted to be mounted on a slide supporting surface of a microscope, and adapted to releasably hold a slide on said slide supporting surface of said microscope for viewing with said microscope, wherein said microscope slide clip comprises:

a clip blade means for releasably holding said slide;
a resilient means; and
a brace means for mounting said clip blade means and said resilient means to said slide supporting surface of said microscope;
wherein said brace means is oriented generally at a right angle with respect to said slide supporting surface of said microscope;
wherein said contoured clip blade means comprises a forwardly extending holding portion for releasably holding said slide, a rearwardly extending actuating portion and an intermediate pivot portion;
wherein said resilient means is located between said slide supporting surface of said microscope and said clip blade means, and wherein said pivot portion of said clip blade means is resiliently supported by said resilient means;
wherein said resilient means and said forwardly extending holding portion of said clip blade means are shaped and sized to enable said holding portion of said clip blade means to hold said slide when said rearwardly extending actuating portion of said clip blade means is not depressed by a user; and
wherein said resilient means and said rearwardly extending actuating portion of said clip blade means are shaped and sized to permit said user to easily depress said rearwardly extending actuating portion of said clip blade means with his finger to cause said clip blade means to pivot vertically on said resilient means to cause said forwardly extending holding portion of said clip blade means to raise clear of and release said slide to permit said slide to be inserted or removed from beneath said forwardly extending holding portion of said clip blade means.

2. A microscope slide clip according to claim 1, wherein said brace means has a threaded stem which is adapted to be screwed into said slide supporting surface of said microscope to mount said brace means to said microscope.

3. A microscope slide clip according to claim 2, wherein said brace means has a head which is knurled for a better grip to enable said brace means to be more easily screwed into said slide supporting surface of said microscope and tightened by hand.

4. A microscope slide clip according to claim 1, wherein said slide clip further comprises a screw having a threaded shank; wherein said brace means defines a bore adapted to receive said threaded shank of said screw, and wherein said screw is adapted to fasten said brace means to said microscope by being screwed into said slide supporting surface of said microscope.

5. A microscope slide clip according to claim 1, wherein said resilient means comprises a spring.

6. A microscope slide clip according to claim 1, wherein said resilient means comprises a tubular piece of resilient material.

* * * * *